United States Patent [19]

Kemski

[11] 4,341,825
[45] Jul. 27, 1982

[54] FOG-RESISTANT, HEAT-SEALABLE FILM

[75] Inventor: Michael B. Kemski, St. Paul, Minn.

[73] Assignee: Minnesota Mining and Manufacturing Company, St. Paul, Minn.

[21] Appl. No.: 124,421

[22] Filed: Feb. 25, 1980

[51] Int. Cl.$^3$ .......................... C09J 7/02; B65D 75/00
[52] U.S. Cl. ...................................... 428/35; 206/484;
  206/484.2; 426/124; 426/129; 428/343;
  428/345; 428/347; 428/349; 428/351; 428/480;
  428/483; 428/913
[58] Field of Search ............... 428/480, 345, 420, 483,
  428/35, 343, 347, 349, 351, 913; 106/13;
  260/31.6; 206/484, 484.2; 426/124, 129

[56] References Cited

U.S. PATENT DOCUMENTS

| | | | |
|---|---|---|---|
| 3,022,178 | 2/1962 | Park et al. | 106/13 |
| 3,048,266 | 8/1962 | Hackhel et al. | 106/13 X |
| 3,188,265 | 6/1965 | Charbonneau et al. | 428/420 |
| 3,188,266 | 6/1965 | Charbonneau et al. | 428/420 X |
| 4,127,688 | 11/1978 | Bieler et al. | 428/420 X |
| 4,218,510 | 8/1980 | Willson | 428/420 X |

*Primary Examiner*—Thomas J. Herbert, Jr.
*Attorney, Agent, or Firm*—Cruzan Alexander; Donald M. Sell; James V. Lilly

[57] ABSTRACT

A transparent, heat-sealable, laminated film is provided that comprises a first layer of a difficultly heat-sealable polymer chemically interfacially bonded to a second layer of a readily heat-sealable polymer. The second layer contains from about 0.3% to 0.7% by weight of an anti-fogging agent. The film resists the formation of fog when utilized to package refrigerated foods.

9 Claims, No Drawings

FOG-RESISTANT, HEAT-SEALABLE FILM

BACKGROUND OF THE INVENTION

This invention relates to fog-resistant films. More particularly it relates to heat-sealable, fog-resistant films that comprise two polymeric film layers chemically interfacially joined to one another by a bond that is so strong that the two layers cannot be mechanically separated. Such films may sometimes be referred to hereinafter as fog-resistant, self-unified films.

Self-unified films are known and are described in U.S. Pat. Nos. 3,188,265 and 3,188,266 issued to Robert R. Charbonneau and Joseph F. Abere. These patents describe heat-sealable laminate film structures that are prepared by forming an interface between the surfaces of two polymer film layers one of which is more transmissive to ultraviolet light than the other, and then irradiating the interfacial area with ultraviolet light at an intensity and for a time sufficient to provide a chemical interfacial bond between the two layers. The two layers are thus bonded together without the use of any adhesive materials.

The resultant films are resistant to moisture upon prolonged contact with water. Additionally, they resist penetration by vapors such as water vapor, oxygen, etc. Consequently, when these films are employed to package refrigerated moisture-producing materials (particularly meats) they cause moisture to condense on their inner surface thereby fogging the package and either eliminating or substantially reducing the visibility of the food.

Various attempts have been made in the past to provide anti-fogging films for packaging refrigerated foods. Thus, for example, U.S. Pat. No. 3,022,178 discloses the application of a coating of a mixture of an alkyl phenyl polyethylene glycol ether and an alkaline metal salt or a fatty alcohol sulfate to polystyrene film to render it anti-fogging. British Pat. No. 1,206,089 discloses the addition of a mixture of the reaction product of (i) ethylene oxide and an alcohol containing 8 to 18 carbon atoms, (ii) a polyhydric alcohol in which one of the hydroxyl groups has been esterified by combination with a defined class of fatty acid, and (iii) an alkaline metal salt of a diester of sulfosuccinic acid to an olefinic polymer to render the resultant film anti-fogging. U.S. Pat. No. 3,048,266 discloses the addition of ethylene oxide to a polyolefin to render the resultant film anti-fogging.

While each of these approaches has proven useful in reducing fogging, they have not provided film that possesses the strength and durability of a self-unified film. Additionally, they have employed films that are generally considered, at best, to be difficultly heat-sealable.

The present invention provides an advantage over these previous approaches. It provides a transparent, fog-resistant, readily heat-sealable film that may be heat-sealed to a variety of materials. Thus, the films of the present invention may be readily heat-sealed to polymers such as polystyrene, thermoplastic polyesters, and polyethylene, to paper, and to itself. Thus, the present invention provides a significant advantage over the prior art in that it can be employed either alone or in conjunction with other materials to provide packages for refrigerated foods.

SUMMARY OF THE INVENTION

In accordance with the present invention there is provided a transparent, heat-sealable, laminated film that comprises a first film layer of a difficultly heat-sealable organic polymer and a second film layer of a readily heat-sealable organic polymer chemically interfacially joined to said first film layer by a bond that is so strong that said layers cannot be mechanically separated from one another; said second film layer comprising said readily heat-sealable organic polymer and from about 0.3% to 0.7% (preferably about 0.5%) by weight of an alkyl phenyl polyethylene glycol ether of the formula:

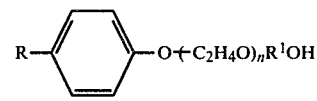

wherein R is an alkyl group containing from about 10 to 15 carbon atoms, $R^1$ is an alkylene group containing from about 1–3 carbon atoms, and n is an integer of from about 4 to 10.

Also provided herein are novel packages that contain a moisture-producing material, said packages comprising a transparent, heat-sealed, laminated film as described above.

As it is used herein, the term "anti-fogging" means that the particular film possessing anti-fogging characteristics exhibits substantially no fogging (that is visible water condensation) after 100 hours exposure to a refrigerated container of water in a test described more fully hereinafter.

Surprisingly, the incorporation of the alkyl phenyl polyethylene glycol ether (sometimes referred to hereinafter as the anti-fogging agent) in the second film layer does not deleteriously affect the chemical interfacial bond between the two film layers. This is surprising because anti-fogging agents are generally considered to be surfactant materials and have found use as wetting agents and emulsifying agents. Thus, one would expect that these materials would reduce the strength of the chemical interfacial bond between the two polymer layers.

Additionally, it was previously felt that the use of any additives other than very small amounts in either of the film layers would interfere with the formation of the bond between the two layers. Consequently, the use of additives was avoided. However, it now has been found that anti-fogging agents can be successfully employed in these types of films at the levels described above.

DESCRIPTION OF THE PREFERRED EMBODIMENTS

The films of the present invention typically have a thickness in the range of about 0.0005 to 0.02 cm (preferably in the range of about 0.0015 to 0.004 cm). They may be prepared by known processing techniques such as are described more fully hereinafter.

As has been stated, the films of the present invention comprise a first film layer of a difficultly heat-sealable organic polymer and a second film layer of a readily heat-sealable organic polymer. The first film layer preferably comprises a polyester, and most preferably a biaxially oriented and heat-set polyester. The thickness of the first film layer is not critical to the present invention. However, typically it is in the range of 0.006 to 0.002 cm. thick. Most preferably it is about 0.00125 cm thick.

A number of polyesters are useful as the first film layer. Preferably, the polyester comprises poly(ethylene terephthalate). However, other polyesters such as poly(1,4-cyclohexylenedimethylene terephthalate) and poly(ethylene naphthalate) may be employed as the first film layer.

The polyester employed as the first film layer may be prepared from the reaction of the appropriate dicarboxylic acid with ethylene glycol. Alternatively, the acid may be converted to the ester and then allowed to react with the glycol by ester interchange. Generally, the amount of glycol employed is in excess of the stoichiometric amount required to react with the acid. Minor amounts (e.g., up to 10 mole percent) of other dicarboxylic acids such as isophthalic, phthalic, 2,5- or 2,7-naphthalene dicarboxylic, succinic, subacic, adipic, azelaic, subaric, pimelic, glutaric, etc. or a diester thereof may be substituted for the acid without deleteriously affecting the properties of the resultant polyester. Additionally, minor amounts (e.g., up to 10 mole percent) of other glycols such as 1,3-propane diol, 1,4-butane diol, etc. may be substituted for the ethylene glycol.

The second film layer preferably comprises an organic polymer whose skeletal chain substantially comprises saturated carbon-to-carbon linkages. The polymer is branched, that is it is non-linear.

Preferably the organic polymer used in the second film layer is selected from the group consisting of polyethylene that has a density of less than about 0.925 g/cm$^3$; and copolymers of ethylene and (i) acrylic acid, (ii) ethyl acrylate, and (iii) vinyl acetate.

Representative examples of polymeric materials useful as the second film layer include low density polyethylene (i.e., density of less than about 0.925 g/cm$^3$) such as DFD-3300, density of a 0.918 g/cm$^3$ commercially available from Union Carbide Corporation; ethylene vinyl acetate copolymers such as DQD 3737, 28% vinyl acetate units commercially available from Union Carbide Corporation. ethylene acrylic acid copolymer such as type 2375.12, density of 0.932 g/cm$^3$ commercially available from Dow Chemical Company. Most preferably the thickness of this layer is about 0.0017 cm. thick.

The anti-fogging agent comprises a class of alkyl-phenyl polyethylene glycol ethers (also known as alkyl phenoxy poly(ethylene oxy) ethanols) of the formula:

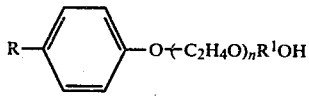

wherein R, R$^1$, and n are as defined above. These compounds are prepared by the reaction of the corresponding alkyl phenol, that is decyl phenol, dodecyl phenol, etc., with from 4 to 10 moles of ethylene oxide.

Representative examples of useful anti-fogging agents include the IGEPAL ® series of materials available from GAF Corporation and the T-DET ® series of materials available from the Thompson-Hayward Chemical Company. Specific useful examples of each of these series of materials include:

T-DET ® DD-5 which comprises the reaction product of dodecyl phenol with 5 moles of ethylene oxide, and is believed to have the formula:

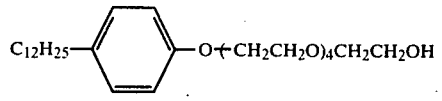

IGEPAL ® RC 520 which comprises the reaction product of dodecyl phenol with 6 moles of ethylene oxide, and believed to have the formula:

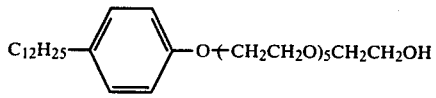

T-DET ® DD-7 which comprises the product of dodecyl phenol with 7 moles of ethylene oxide, and is believed to have the formula:

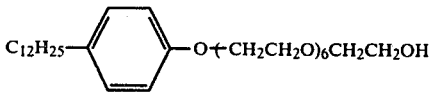

T-DET ® DD-9 which comprises the reaction product of dodecyl phenol with 9 moles of ethylene oxide, and is believed to have the formula:

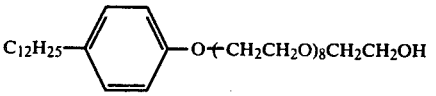

IGEPAL ® RC-620 which comprises the reaction product of dodecyl phenol with 10 moles of ethylene oxide, and is believed to have the formula:

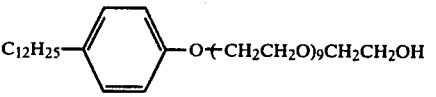

IGEPAL ® RC-630 which comprises the reaction product of dodecyl phenol with 11 moles of ethylene oxide, and is believed to have the formula:

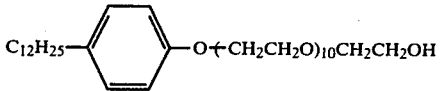

Most preferably the anti-fogging agent comprises the reaction product of dodecyl phenol with 6 moles of ethylene oxide. Such compounds are commercially available as described above.

The films of the present invention may be prepared by known processing techniques. Thus, the anti-fogging agent may be incorporated into the second film layer by blending the organic polymer with the anti-fogging agent and until a uniform mixture is obtained or until the anti-fogging agent has coated the surface of organic polymer. The mixture may then be extruded onto a previously prepared first film layer. As a result, the anti-fogging material is dispersed throughout the second film layer rather than being present as a simple coating on said layer.

The resulting laminated film is then heated to about 130° C. and exposed to ultraviolet light in the wavelength range of about 1800 to 4000 angstroms through the second film layer for a time and at an intensity sufficient to cause the formation of the chemical interfacial bond between the two layers.

The duration of heating and irradiation may be varied depending upon the light source, the distance from the source to the film, and the thickness of the second film layer. It has been found that heating and irradiating the films for about 10 to 15 seconds at a distance of 2 to 4 cm from a model G-25T8 25 watt germicidal ultraviolet light, available from the General Electric Company, provides a film structure which is appropriately chemically interfacially bonded. The process for irradiation with ultraviolet light is described in more detail in U.S. Pat. No. 3,188,266 at column 4, line 30-column 5, line 60. This disclosure is incorporated herein by reference.

Other ingredients may also be added to the second film layer. Thus, for example, minor amounts of antioxidants may be incorporated into this layer without harming the chemical interfacial bond. Preferably the antioxidants comprise no more than about 0.01% by weight of the second film layer.

The films of the present invention may be employed in conventional heat sealing equipment to provide a heat-sealed tray lid for refrigerated foods. Alternatively, they may be heat-sealed to themselves to provide a heat-sealed pouch. In either event, the second film layer is contacted with the substrate to which heat-sealing is to be effected. The film may then subjected to conventional heat sealing techniques and conditions to provide the finished package. The second film layer is, therefore, located on the inside of the finished package and presents an anti-fogging surface to the moisture-producing material.

The present invention is further illustrated by the following examples.

EXAMPLE 1

A transparent, heat-sealable, laminated film according to the present invention was prepared. A readily heat-sealable polymer (ethylene vinyl acetate (EVA) copolymer containing 28% by weight vinyl acetate units and being available from Union Carbide Corporation as DQD 3737) was contacted with 0.5% by weight of dodecylphenoxypoly(ethyleneoxy) ethanol. The ingredients were tumbled in a drum until the copolymer had been coated with the dodecylphenoxypoly(ethyleneoxy) ethanol. This was accomplished in about 20 minutes. The coated heat-sealable polymer was then extruded onto a 0.00125 cm thick film of biaxially oriented and heat-set poly(ethylene therephthalate). The resulting film structure was heated to about 130° C. and exposed to electromagnetic radiation in the wavelength range of from about 1800 to 4000 angstroms from a model G25T8, 25 watt germicidal ultraviolet light commercially available from the General Electric Company for about 17 seconds. The light was located about 2.5 cm. from the film structure. The resulting transparent, heat-sealable laminated film had a readily heat-sealable layer of EVA copolymer chemically interfacially joined to a difficultly, heat-sealable layer of poly(ethylene terephthalate). The strength of the bond between the two layers was so strong that they could not be mechanically separated from one another.

The resulting film was heat sealed to a polystyrene tray full of water. The EVA copolymer layer contacted the tray. The sealed tray was then stored in a 38° F. (3.3° C.) refrigerator and visually observed for the formation of fog (that is individual droplets of water) on the EVA copolymer layer. No fog was observed on the film even after 168 hours in the refrigerator.

EXAMPLES 2-8

Example 1 was repeated except that various amounts of different anti-fog agents were incorporated into the EVA film layer. The resultant films were tested for their anti-fog characteristics. The anti-fog additives, quantities used (in % by weight of the EVA), and results obtained are set forth in Table 1. In this Table, the notation FG means that fog was observed while the notation CL means that no fog was observed but rather the film remained clear.

TABLE 1

| EXAMPLE | ANTI-FOG ADDITIVE TYPE | % BY WEIGHT | ANTI-FOG PROPERTIES (HRS.) | | | |
|---|---|---|---|---|---|---|
| | | | 1 | 18 | 115 | 153 |
| 2 | A | 0.1 | FG | FG | FG | FG |
| 3 | A | 0.3 | CL | CL | CL | CL |
| 4 | B | 0.5 | CL | CL | CL | FG |
| 5 | C | 0.5 | FG | CL | CL | FG |
| 6 | D | 0.5 | CL | CL | CL | CL |
| 7 | E | 0.5 | FG | CL | CL | CL |
| 8 | F | 0.5 | CL | CL | CL | CL |

A $C_{12}H_{25}$—⟨phenyl⟩—O—$(CH_2CH_2O)_5CH_2CH_2OH$, IGEPAL® RC-520.

B $C_{12}H_{25}$—⟨phenyl⟩—O—$(CH_2CH_2O)_9CH_2CH_2OH$, IGEPAL® RC-620.

C $C_{12}H_{25}$—⟨phenyl⟩—O—$(CH_2CH_2O)_{10}CH_2CH_2OH$, IGEPAL® RC-630.

D $C_{12}H_{25}$—⟨phenyl⟩—O—$(CH_2CH_2O)_4CH_2CH_2OH$, T-DET® DD-5.

E $C_{12}H_{25}$—⟨phenyl⟩—O—$(CH_2CH_2O)_6CH_2CH_2OH$, T-DET® DD-7.

F $C_{12}H_{25}$—⟨phenyl⟩—O—$(CH_2CH_2O)_8CH_2CH_2OH$, T-DET® DD-9.

This data demonstrates that the second film layer must contain at least 0.3% by weight of the anti-fog additive in order to be free from fog. It also indicates that a variety of dodecylphenoxypoly(ethyleneoxy) ethanols are useful in the present invention.

EXAMPLES 9-11

Example 1 was repeated except that different readily heat-sealable organic polymers were employed in place of the EVA. The ingredients employed and the results obtained in the fog test are set forth in Table 2.

TABLE 2

| EX. | SECOND FILM LAYER | ANTI-FOG PROPERTIES (HRS.) | | | |
|---|---|---|---|---|---|
| | | 1 | 18 | 115 | 153 |
| 9 | LDPE[a] | CL | CL | CL | CL |
| 10 | EAA[b] | CL | CL | CL | CL |

[a] Low density polyethylene, density of .918 g/cm³, available as DFD 3300 from Union Carbide Corporation.
[b] Ethylene acrylic acid copolymer, density .932 g/cm³, available as type 2375.12 from Dow Chemical Company.

What is claimed is:

1. A transparent, heat-sealable, laminated film that comprises a first film layer of a difficultly heat-sealable biaxially oriented and heat set saturated polyester, and a second film layer of a readily heat-sealable organic polymer chemically interfacially joined to said first film layer by a bond that is so strong that said layers cannot be mechanically separated from one another, wherein said second film layer comprises a non-linear polyolefin polymer and from about 0.3 to 0.7 percent by weight of an anti-fogging agent which consists essentially of an alkylphenyl polyethylene glycol ether of the formula:

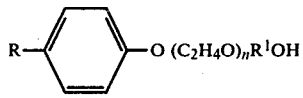

wherein R is an alkyl group containing from 10 to 15 carbon atoms, $R^1$ is an alkylene group containing from about 1 to 3 carbon atoms, and n is an integer of from 4 to 10.

2. A package that contains a moisture-producing material, said package comprising a heat-sealed, laminated film according to claim 1.

3. A film according to claim 1 wherein said polyester is poly(ethylene terephthalate).

4. A film according to claim 1 wherein said first film layer of biaxially oriented and heat set polyester is poly(ethylene terephthalate), and wherein said second film layer comprises (i) a copolymer of ethylene and vinyl acetate that contains about 28% by weight vinyl acetate units, and (ii) about 0.5% by weight of the reaction product of dodecyl phenol and 6 moles of ethylene oxide.

5. A film according to claim 1 wherein said polyolefin is selected from (a) polyethylene that has a density of less than about 0.925 $g/cm^3$, and (b) copolymers of ethylene and (i) acrylic acid, (ii) ethyl acrylate, and (iii) vinyl acetate.

6. A film according to claim 5 wherein said polyolefin is a copolymer of ethylene and vinyl acetate.

7. A film according to claim 6 wherein said copolymer contains about 28% by weight vinyl acetate units.

8. A film according to claim 1 wherein said alkylphenyl polyethylene glycol ether comprises the reaction product of dodecyl phenol and from 5 to 11 moles of ethylene oxide.

9. A film according to claim 8 wherein said alkylphenyl polyethylene glycol ether comprises the reaction product of dodecyl phenol and 6 moles of ethylene oxide.

* * * * *